Patented May 23, 1939

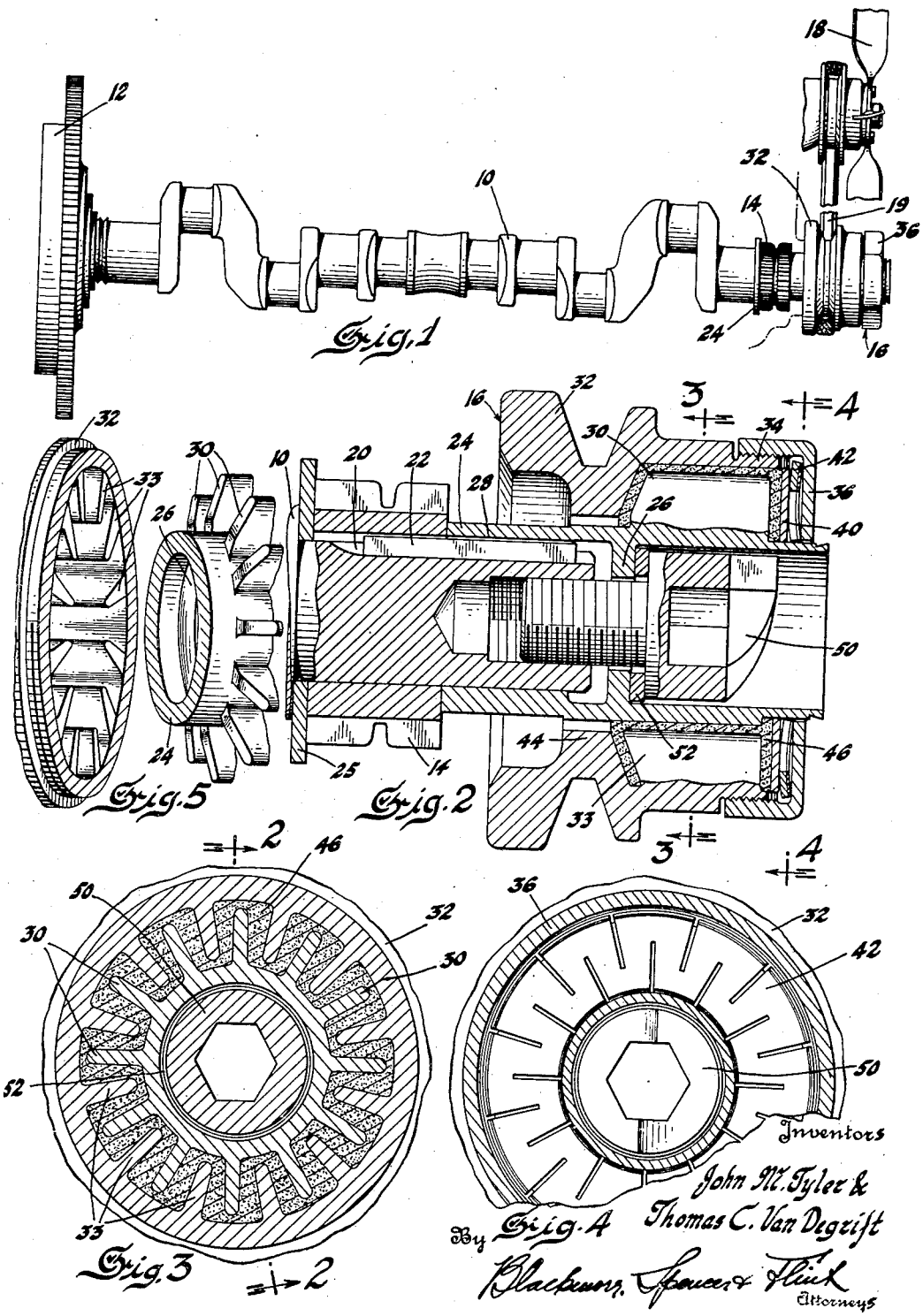

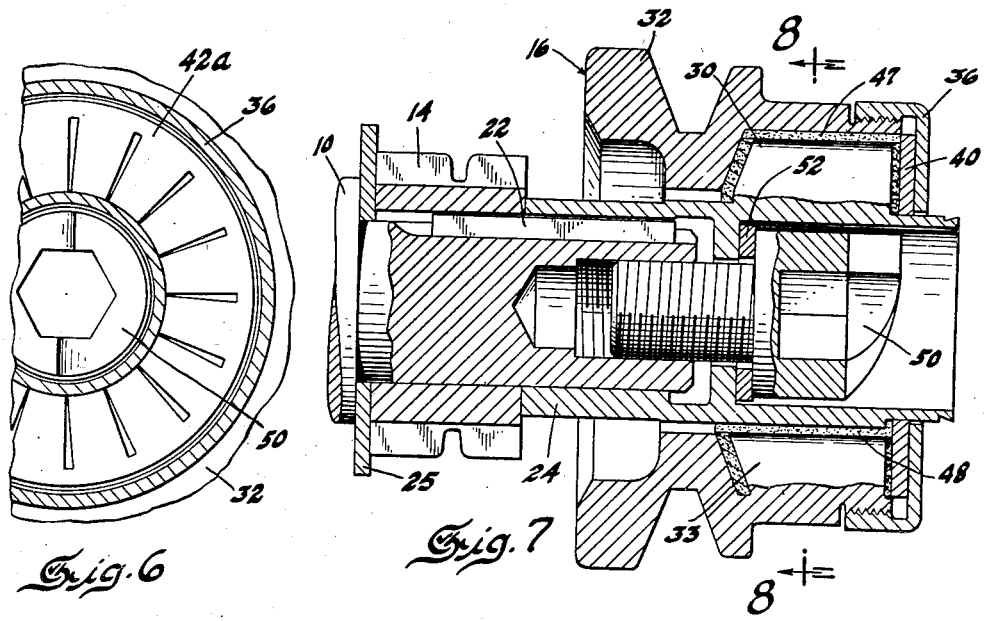
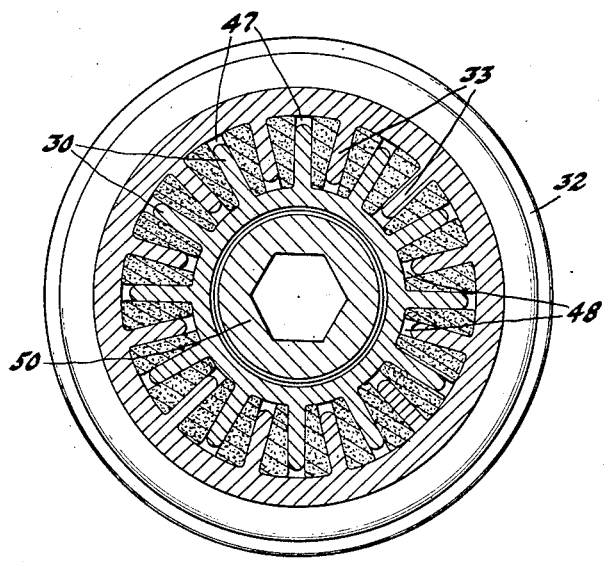

2,159,235

UNITED STATES PATENT OFFICE 2,159,235

TORSIONAL VIBRATION SUPPRESSOR

John M. Tyler, Birmingham, and Thomas C. Van Degrift, Detroit, Mich., assignors to General Motors Corporation, Detroit, Mich., a corporation of Delaware Application April 4, 1934, Serial No. 718,950

8 Claims. (Cl. 74—574)

This invention relates to devices for suppressing or minimizing torsional vibrations in engine crankshafts and the like.

The principal object of the invention is to dampen and balance out torsional vibrations by an inertia body secured to one end of a crankshaft by means of a mass of elastic rubber in such manner as to take full advantage of the elasticity and high internal friction of rubber.

This and other objects are attained by an assembly of concentrically disposed metallic members and a mass of interposed rubber, associated with means for adjustably compressing the rubber, adapted to be secured to the front end of an engine crankshaft by the so-called "starter nut". The vibration suppressing device for convenience is herein specifically named a vibration damper.

Fig. 1 is a conventional illustration of an automobile engine crankshaft having at its front end a torsional vibration damper constructed in accordance with this invention;

Fig. 2 is a longitudinal section through the front end of an engine crankshaft and an attached damper, on the line 2—2 of Fig. 3;

Fig. 3 is a section through the damper on the line 3—3 of Fig. 2;

Fig. 4 is a fragmentary sectional view taken on the line 4—4 of Fig. 2, disclosing the construction of a bi-metallic thermostat;

Fig. 5 is a fragmentary view of the inner and outer metallic parts of the damper separated;

Fig. 6 is a view of a form of thermostat slightly different from that shown in Fig. 4;

Fig. 7 is a longitudinal section through a slightly different form of damper from that shown in Fig. 2;

Fig. 8 is a cross section on the line 8—8 of Fig. 7.

In the drawings, numeral 10 represents the crankshaft of an automobile engine, numeral 12 (Fig. 1), the usual flywheel at the rear end of the crankshaft, 14, a sprocket or equivalent wheel for operating the timing devices, 16, the vibration damper, 18, a cooling fan which is shown as driven by a belt 19 engaging a groove in the outer member of the damper.

The vibration suppressor or damper of this invention is designed as an attachment adapted to be applied to the front end of an automobile engine crankshaft. As shown in Fig. 2, there is a groove 20 in the front end of crankshaft 10. The timing sprocket wheel 14 is keyed to the shaft as by key 22 engaging groove 20 and an inner groove in the sprocket wheel and is prevented from rearward movement by washer 25 seated against a shoulder on the shaft.

The vibration damper is composed of two principal metallic members concentrically disposed. The inner member consists of a hollow member 24 provided with an annular internal flange 26 between its ends and with an internal longitudinal groove 28 to receive the key 22 when said member 24 is fitted over an end of the crank shaft. Said member 24 is provided with a series of external radiating blade-like elements 30 forward of the internal flange 26.

The outer member 32 of the vibration damper is a relatively heavy body of adequate inertia which may be grooved to receive the fan driving belt 19 and the front end of which is hollowed out and formed with radially inward projecting blades 33 intercalated with and spaced in a circumferential sense from the blades 30 when the two members of the balancer are properly assembled. The front end of member 32 is externally screw threaded as at 34 to engage the threaded flange of a nut 36 sleeved over the forward extremity of the member 24. When the two metallic members 24 and 32 of the balancer are assembled in concentric relation as shown in Figs. 2 and 3, the entire space between the blades 30 and 33 and around them is filled with rubber. The blades 30 and 33 do not extend the full length of the cavity in the member 32, thus leaving space to be filled with rubber at the ends of the blades. Also the longitudinal edges of blades 30 are spaced from the inner wall of member 32 while the longitudinal edges of blades 33 are spaced from the outer wall of member 24 and these spaces may be filled with rubber.

The front end of member 32 is left open so that a washer or annular presser plate 40 having a diameter not greater than the greatest inside diameter of the open end of said member may contact with the forward face of the rubber mass.

Between washer 40 and nut 36, Fig. 2 shows a bi-metallic thermostat 42 formed as a ring which tends to maintain even pressure upon the washer 40 throughout variations of temperature. The thermostatic device 42 is normally curved in cross section as shown in Fig. 2, and is transversely slotted by overlapping radial slots alternately extending from opposite edges, for the purpose of relieving internal strains that might prevent the metal from curving in the desired manner in response to temperature changes. The thermostat may, however, consist of a bimetallic ring having slots radiating from the inside or concave edge of the ring only as shown in Fig. 6. The form of thermostat shown in Fig. 6 may be very easily manufactured from a straight bi-metallic flat strip in which parallel slots may be cut and the strip thereafter bent edgewise into an annulus, as shown.

As illustrated in Fig. 2, the outer member 32 of the vibration suppressor is provided with an internal flange 44 which approaches nearly to the outer surface of the internal member 24. The inner annular surface of the flange 44 is preferably separated from the outer surface of the member 24 leaving an annular void so that the outer member 32 is supported on and joined to the member 24 by means of a mass of solid rubber 46, there being no metallic contact between said two members. If desired, however, a filling bushing may be fitted into the space between the inner surface of the flange 44 and the outer surface of the member 24. In any event it is desirable to coat all parts of the rubber mass with which lubricating oil is likely to contact with a coating liquid of "drying" type insoluble in petroleum or its fractions. Many oil varnishes are suitable for a protective coating of this sort. The composition disclosed in United States Patent #1,847,445 is also suitable for this purpose. Protective coating liquid of the drying or oxidizing type may be poured into space between the inner surface of flange 44 and member 24. This liquid will penetrate to all surfaces that can be reached by lubricating oil entering the same space.

By providing voids within the mass of the rubber mounting between the members 24 and 32, the use of thermostat 42 or 42a may be dispensed with. As illustrated in Fig. 7 a washer or annular presser plate 40 bears against the front face of the rubber mass and is in direct contact with the inner face of the flanged nut 36. Fig. 7 shows voids 47 between the edges of the inner blades 30 and the inner surface of member 32 and other voids 48 between the edges of the outer blades 33 and outer surface of member 24. The rubber mass may, therefore, be put under pressure by screwing up the nut 36 causing the rubber mass to deform and squeeze more or less into the voids.

The assembly, consisting of the inner and outer members 24 and 32 united by the rubber mass, which has been preloaded to any desired degree by screwing up the nut 36, is assembled with the crankshaft by slipping it over the front end of the shaft as illustrated in Fig. 2 and then inserting a so-called "starting nut" such as 50, Fig. 2, and screwing up the starting nut until the rear end of the inner member 24 is stopped from further advance by the timing wheel 14. The starter nut 50 is provided with the usual head with a ratcheted end to receive a starting crank and with a hexagonal or other non-round cavity to engage a spanner or the like for tightening the nut. A lock washer 52 may be interposed between the head and the front side of the inner flange 26 of the member 24. Pressure in an axial direction can be applied to member 24 in assembling the device, by rotating the starting nut in the proper direction; the lock washer prevents it from loosening after it has been tightened.

The rubber may be molded between the inner and outer members, or may be molded to form in separate molds. Voids may be formed in the mass by inserting removable cores before introducing rubber into the molds. Or separate blocks of premolded rubber may be introduced between the blades.

It will be understood that a confined mass of solid rubber tends to expand as the temperature rises. If no space is provided to permit deformation under pressure the frequency rate of the rubber rises with the temperature.

In the form of the invention disclosed in Fig. 7, the rubber mass is preloaded by setting up the nut 36, which may be locked after the desired degree of pressure on the rubber has been attained. The locking may be effected by a spot weld between the threads of nut 36 and member 32 or otherwise. If now the temperature of the rubber increases it may deform into voids 47 and 48, the frequency remaining substantially the same as before.

In the form of the invention disclosed in Fig. 2, in which a body of rubber without voids fills the space between members 24 and 32, the rubber mass is preloaded by setting up the nut 36, thereby forcing the thermostatic ring (42 or 42a) against presser plate 40, and plate 40 against the end-face of the mass of rubber. The thermostatic ring tends to flatten as the temperature rises, and to curve as the temperature falls. Thus, through all ordinary changes of temperature the body of rubber maintains substantially the same frequency rate because the thermostat relieves pressure as the temperature goes up and increases pressure as the temperature goes down.

We claim:

1. In a torsional vibration suppressor, an inner member provided with outward radiating blades, an outer inertia member surrounding the inner member, said outer member having one end open, and inward radiating blades intercalated with and spaced circumferentially from the blades of the inner member, said blades of both members terminating short of said open end; elastic rubber disposed between the blades of the inner and outer members and extending beyond the ends of said blades toward said open end, an annular presser device bearing against the rubber at the open end, and means for adjusting said annular device against the rubber.

2. In a torsional vibration suppressor, an inner member provided with outward radiating blades, an outer inertia member surrounding the inner member, said outer member having external threads, an open end, and inward radiating blades intercalated with and spaced circumferentially from the blades of the inner member; elastic rubber disposed between and extending beyond said blades toward the open end, an annular presser device of less diameter than the internal diameter of the outer member the open end of said presser device bearing against the face of the rubber exposed at the open end, and means comprising a nut having a threaded flange cooperating with the thread on the outer inertia member for adjusting the presser device.

3. In a torsional vibration suppressor, an inner member provided with outward radiating blades, an open ended outer inertia member surrounding the inner member and having inward radiating blades intercalated with and spaced circumferentially from the blades of the inner member; an integral mass of elastic rubber having voids therein disposed between the inner and outer members, said rubber disposed in the space between and around the blades, and adjustable presser means bearing against the face of the rubber exposed at the open end of the outer inertia member.

4. In a torsional vibration suppressor, an inner member, a hollow outer inertia member surrounding the inner member, an integral mass of elastic rubber disposed between the inner and outer member for securing said members together, said mass of rubber having voids therein, and adjustable means for applying pressure to said rubber and holding it under pressure in order to regulate its periodicity.

5. In a torsional vibration suppressor, an inner member provided with outward radiating blades, a hollow outer inertia member surrounding the inner member, said outer member being open at one end and having inward radiating blades intercalated with and spaced circumferentially from the blades of the inner member, said blades extending longitudinally and radially of less extent than the cavity of the hollow outer member; an integral mass of elastic rubber disposed between the inner and outer members, said rubber being disposed in the spaces between the blades and extending forward of said blades and having voids therein; a presser plate disposed against the exposed face of the rubber at the open end of the outer member, said plate being of less diameter than the internal diameter of the outer member at its open end, and means including a nut threaded upon the outer member for applying an axially directed force to the presser plate.

6. In a torsional vibration suppressor, an inner member provided with outward radiating blades, an outer inertia member surrounding the inner member, said outer member being open at one end and having inward radiating blades intercalated with and spaced circumferentially from the blades of the inner member; solid elastic rubber disposed between the inner and outer members, said rubber filling the spaces between the members, and adjustable presser means bearing against the face of the rubber exposed at the open end of the outer inertia member, said presser means including a thermostatic device arranged to vary the pressure on the exposed face of the rubber in accordance with changes of temperature.

7. In a torsional vibration suppressor as defined in claim 6 in which the presser means includes a bi-metallic radially slitted thermostatic ring arranged to vary the pressure on the exposed face of the rubber in accordance with changes of temperature.

8. In a torsional vibration suppressor as defined in claim 6 wherein the presser means consists of a plate resting against the face of the rubber exposed at the open end of the outer inertia member, an adjustable flanged nut threaded to the end of the outer member and a bimetallic thermostatic ring disposed between the nut and the presser plate.

JOHN M. TYLER.
THOMAS C. VAN DEGRIFT.